United States Patent [19]

Hajek et al.

[11] Patent Number: 5,362,102
[45] Date of Patent: Nov. 8, 1994

[54] SUPPORT ARRANGEMENT FOR SUPPORTING A TRIM MEMBER FROM A STRUCTURAL MEMBER OF A VEHICLE

[75] Inventors: Uwe Hajek, Wolfsburg; Marinus Huisman, Meine; Rainer Roser, Wolfsburg, all of Germany

[73] Assignee: Volkswagen AG, Wolfsburg, Germany

[21] Appl. No.: 120,948

[22] Filed: Sep. 14, 1993

[30] Foreign Application Priority Data

Sep. 14, 1992 [DE] Germany .............................. 4230746

[51] Int. Cl.⁵ ........................ B60R 13/02; B60R 21/02
[52] U.S. Cl. ...................................... 280/751; 280/784
[58] Field of Search ................................. 280/751, 784

[56] References Cited

U.S. PATENT DOCUMENTS 5,169,204 12/1992 Kelman ................................ 280/751

FOREIGN PATENT DOCUMENTS

| 0020308 | 12/1980 | European Pat. Off. . | |
|---|---|---|---|
| 1530873 | 10/1969 | Germany | 280/751 |
| 676981 | 8/1952 | United Kingdom | 280/751 |
| 943785 | 12/1963 | United Kingdom | 280/751 |

*Primary Examiner*—Kenneth R. Rice
*Attorney, Agent, or Firm*—Brumbaugh, Graves, Donohue & Raymond

[57] ABSTRACT

A clip member supporting an interior trim panel in a vehicle has a projecting pin received in a mount on a structural member of the vehicle so as to hold the trim panel in normally spaced relation from the structural member. Upon impact of a passenger with the trim member during a collision, the projecting pin is forced into the mount to reduce the spacing between the trim member and the structural member while converting impact energy into deformation work.

1 Claim, 1 Drawing Sheet

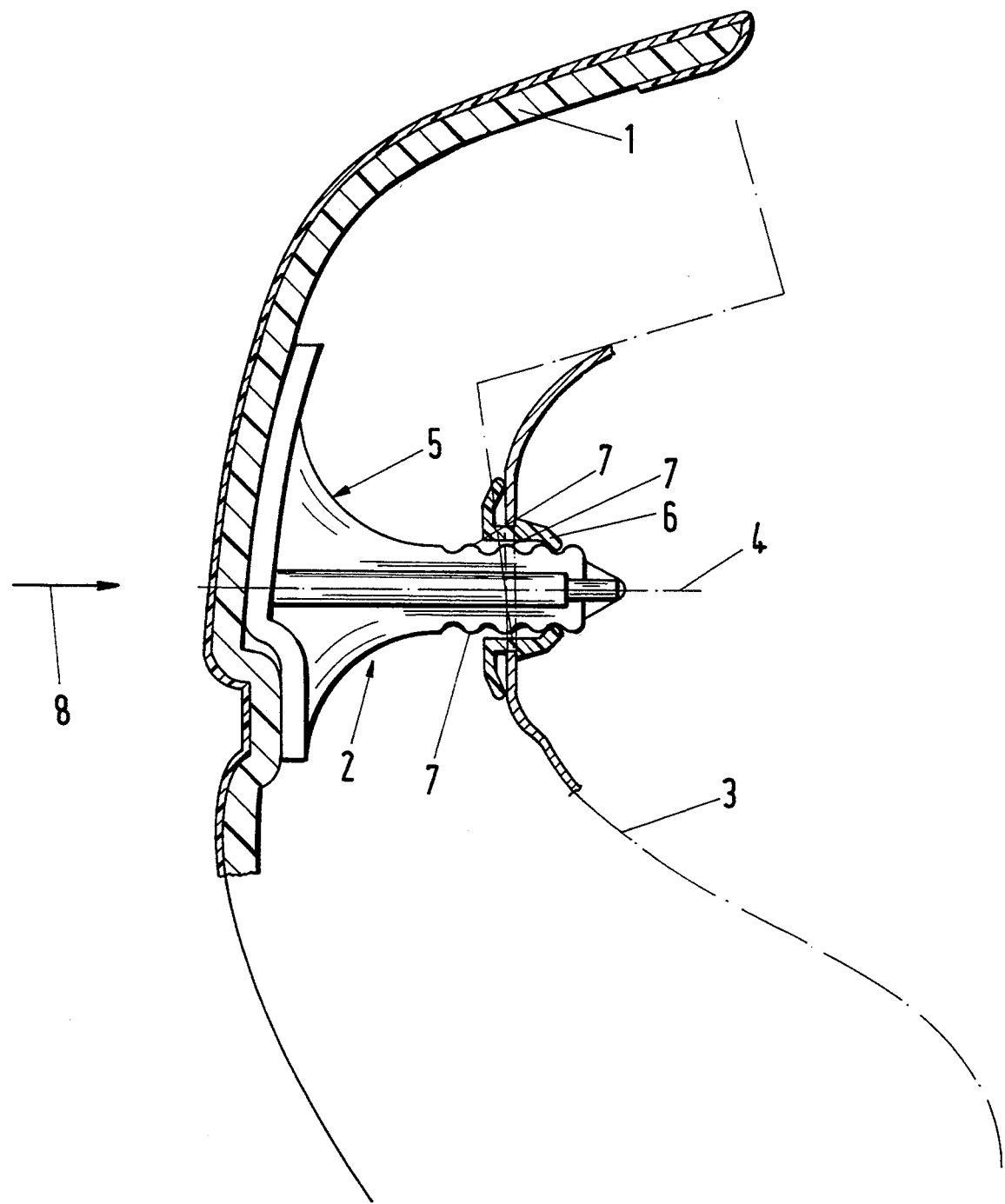

SUPPORT ARRANGEMENT FOR SUPPORTING A TRIM MEMBER FROM A STRUCTURAL MEMBER OF A VEHICLE

BACKGROUND OF THE INVENTION

This invention relates to support arrangements for supporting trim members from structural members in vehicles.

As disclosed, for example, in European Patent Application No. 0 020 308 A1, the use of clip connections for supporting vehicle trim members such as interior panels from columns, door panels or the like of the vehicle provides advantages in assembly of the trim members because such connections can be made without tools simply by pressing the clip pin in the direction of its longitudinal axis into the proper lodgment in a receiving aperture in the vehicle structural member. Elastic lugs or the like projecting from the periphery of the clip pin secure it against slipping out of the aperture in which it is inserted.

One disadvantage of such clip connections is that they provide a hard area of impact for passengers in a collision. This is true even if the clip connection does not extend to the surface of the trim member facing the passenger but is spaced beneath the surface. For effective protection of passengers from injuries due to impact with the clip connection, the trim member would have to have an extremely thick wall.

SUMMARY OF THE INVENTION

Accordingly, it is an object of the present invention to provide a support arrangement for a vehicle trim member which overcomes the disadvantages of the prior art.

Another object of the invention is to provide a vehicle trim support arrangement having a simple structure and providing improved passenger safety.

These and other objects of the invention are attained by providing a support arrangement including a vehicle structural member having a clip-receiving opening and a clip arranged to be retained in the opening to support a trim member in spaced relation to the structural member and shaped to be forced farther into the opening on impact of a passenger against the trim member.

A special advantage of the invention is that it does not merely offer a yieldingness of the support arrangement upon impact of a passenger, that is, a giving way of the clip member. Instead, the support arrangement, because of the axial displacement of the clip member relative to the support opening, also contributes to the conversion of kinetic energy into deformation work in response to the force applied to it.

BRIEF DESCRIPTION OF THE DRAWING

Further objects and advantages of the invention will be apparent from a reading of the following description in conjunction with the accompanying drawing, which is a view in cross-section illustrating a representative embodiment of the present invention as used in supporting a door trim panel from a structural member in a door.

DESCRIPTION OF PREFERRED EMBODIMENT

In the typical embodiment of the invention shown in the drawing, a door trim member 1, which may be constructed and formed in any known manner, is affixed to and supported by a clip member 2 having a pin portion 5 which is axially received and retained in a mount 6 in an opening in a structural door member 3 so as to hold the door trim member 1 in spaced relation to the structural member 3 in the normal operating condition of the vehicle. The clip member 2 and the clip-receiving mount 6 in the structural member 3 are arranged so that, upon impact of a passenger against the door trim member during a collision, the pin portion 5 of the clip member may be forced in the direction of the axis 4 of the pin portion further into the clip-receiving mount and the opening in the structural member 3 so as to convert impact energy into deformation work.

Accordingly, the clip pin portion 5 has an axial length such that, while maintaining a predetermined spacing between the trim member 1 and the structural door member 3, it projects into the mount 6 in the opening in the structural door member.

In the particular embodiment shown in the drawing, the mount 6 constitutes an additional part inserted in the opening in the structural member 3. Alternatively, however, it is possible to form the opening in the structural member 3 itself as a mount for the clip pin portion 5. The clip pin portion 5 is provided with peripheral projections 7 or the like, which may be circumferentially continuous or subdivided into teeth, to engage the mount. In any case, the clip pin portion 5 and the mount 6 are configured so that, upon assembly of the trim member 1 with the structural member 3, the clip pin portion 5 may be pressed into the mount 6 in the direction of its longitudinal axis 4, while axial motion in the opposite direction to release the clip pin member together with the trim member 1 is prevented. The mounting position of the clip pin portion 5 is defined by stops between the trim member and the structural support member.

Upon impact of a passenger with the trim member 1 in the direction indicated by the arrow 8 during a collision, but not during the application of forces to the trim member 1 which are to be expected in normal operation of the vehicle, there will be a further penetration of the pin portion 5 into the mount 6, i.e., motion of the pin portion to the right as seen in the drawing substantially in the direction of its longitudinal axis 4. This causes a reduction of the predetermined spacing between the trim member 1 and the structural door member 3 and, since the motion of the pin portion 5 relative to its mount 6 requires expenditure of force as described previously, the reduction or elimination of the predetermined spacing between the trim member 1 and the structural door member 3 contributes to the conversion of kinetic energy into deformation work because of the structural design of the parts 5 and 6 with respect to each other, i.e. by squeezing of the projections 7 through mount 7.

The invention thus provides a support arrangement for trim members in a vehicle which may be used to advantage in all regions of the vehicle interior that could be dangerous to a passenger in an accident. Thus, the support arrangement of the invention may be used effectively in the region of the dashboard or the side columns of a vehicle.

Although the invention has been described herein with reference to a specific embodiment, many modifications and variations therein will readily occur to those skilled in the art. Accordingly, all such variations and modifications are included within the intended scope of the invention.

I claim:

1. A support arrangement for a trim member facing the interior of a vehicle comprising a structural support member, a trim member, clip means affixed to the trim member and extending in an axial direction between the trim member and the structural support member for supporting the trim member and having an axially-extending clip pin portion with a plurality of axially-spaced projections of substantially the same diameter separated by recesses, and clip mount means on the structural member for receiving the clip pin portion and engaging a recess between adjacent projections in the clip pin portion so as to hold the trim member in normally spaced relation to the structural member to provide an unobstructed spacing between them, but permitting the clip pin portion to be forced into the clip mount means by causing one or more of the projections to enlarge the clip mount means so as to reduce the spacing between the trim member and the structural member while converting kinetic energy into deformation energy upon impact of a passenger with the trim member in the event of a collision.

* * * * *